United States Patent [19]

Perlman

[11] 4,225,786
[45] Sep. 30, 1980

[54] INFRARED DETECTION SYSTEM

[75] Inventor: David E. Perlman, Rochester, N.Y.

[73] Assignee: Detection Systems, Inc., Fairport, N.Y.

[21] Appl. No.: 942,659

[22] Filed: Sep. 15, 1978

Related U.S. Application Data

[63] Continuation-in-part of Ser. No. 786,667, Apr. 11, 1977, abandoned.

[51] Int. Cl.² ............................................. G01J 1/00
[52] U.S. Cl. .................................. 250/342; 250/349
[58] Field of Search ............... 250/338, 339, 340, 342, 250/349, 353; 361/281, 303

[56] References Cited

U.S. PATENT DOCUMENTS

| Re. 29,082 | 12/1976 | Schwartz | 250/342 |
| 3,480,777 | 11/1969 | Astheimer | 250/349 |
| 3,839,640 | 10/1974 | Rossin | 250/353 |
| 3,999,069 | 12/1976 | Taylor et al. | 250/338 |

Primary Examiner—Alfred E. Smith
Assistant Examiner—Janice A. Howell
Attorney, Agent, or Firm—Warren W. Kurz

[57] ABSTRACT

An infrared radiation intruder detection system is disclosed which employs a unique pyroelectric detector array. The array comprises a pyroelectric plastic film having electrodes arranged on opposing surfaces to define a plurality of heat-sensitive capacitors connected in parallel. According to a preferred embodiment, the film of selected detector elements is poled to a polarity opposite that of the other elements to cause internal cancellation of signals due to events which affect an even number of detectors simultaneously.

14 Claims, 8 Drawing Figures

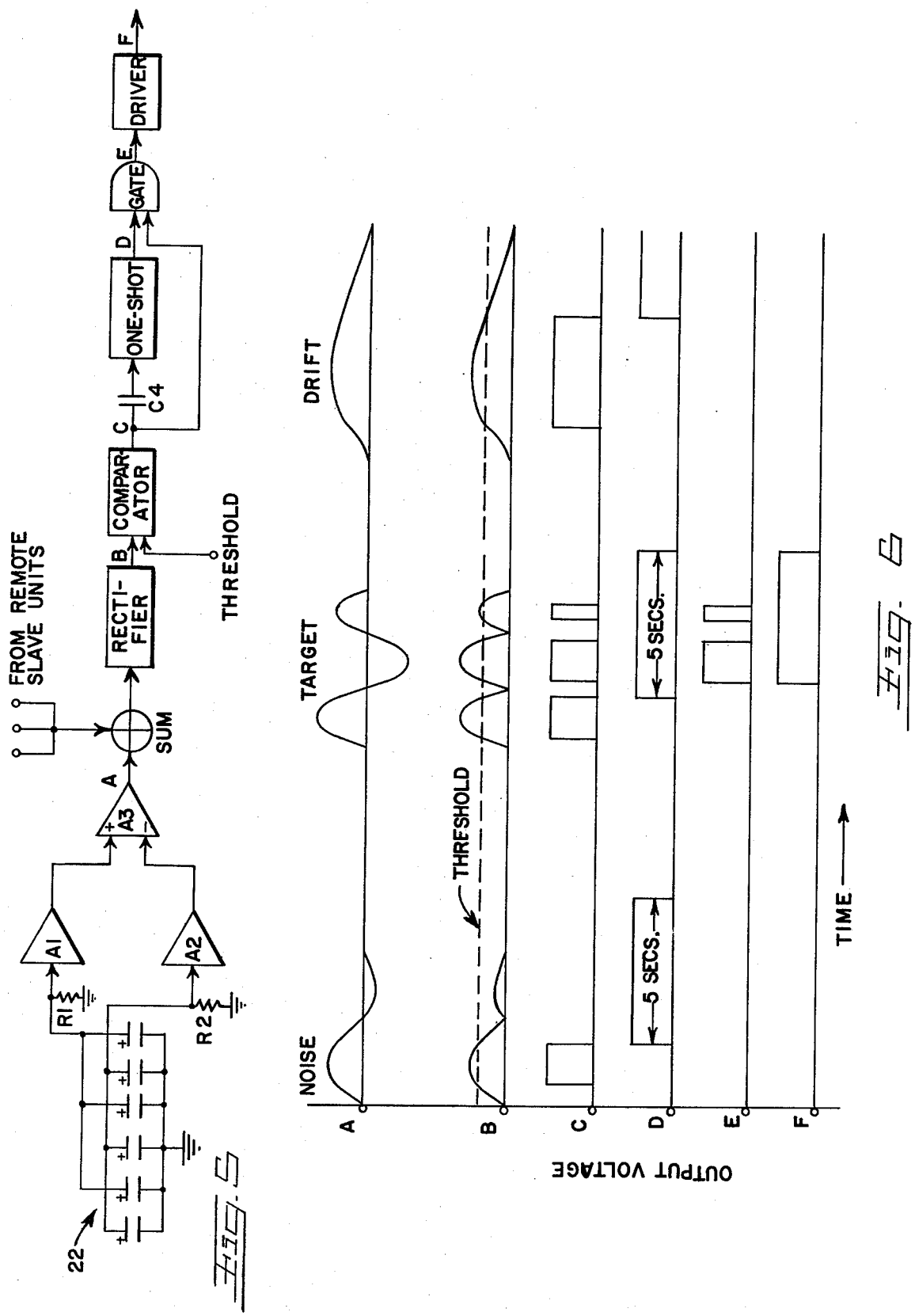

INFRARED DETECTION SYSTEM

CROSS-REFERENCE TO RELATED APPLICATIONS

This application is a continuation-in-part of the commonly assigned U.S. application Ser. No. 786,667, filed on Apr. 11, 1977, now abandoned.

BACKGROUND OF THE INVENTION

This invention relates to improvements in intruder detection systems of the type which sense the presence of an intruder within the boundaries of a space under surveillance by sensing an abnormal rate of change in the ambient temperature of such space, as would be occasioned by the movement therethrough of an intruder whose body heat differs from the steady state ambient temperature.

In U.S. Pat. No. 3,839,640, issued to J. A. Rossin, there is disclosed a passive infrared intruder detection device which employs a pair of heat-sensitive capacitors as the intruder-sensing elements. Each of these capacitors comprises a small piece of polyvinylidene fluoride ($PVF_2$) plastic film sandwiched between a pair of electrodes. This particular film, when appropriately polarized, is well known for its excellent pyroelectric properties, i.e. its ability to generate a readily detectable voltage in response to experiencing a relatively minute change in temperature.

In the Rossin device, the two pyroelectric capacitors are connected in series opposition and are positioned side-by-side at the focus of a concave front surface mirror. By virtue of their difference in position relative to the mirror, each of these detectors has a field of view which differs slightly from the other. When an intruder enters one of the fields of view of the device, his body heat causes a momentary change in the temperature of one of the detectors. This unbalance in the system is detected and an alarm signal is generated in response thereto.

While the Rossin device is functional, it is inherently a narrow field of view device because adding additional detectors, as would be required to expand the field of view, cannot be conveniently effected without complicating the structure, as well as the manufacture of the array. Also, adding additional detectors in series would cause a considerable increase in the impedance of the array, making it difficult to find a suitable preamplifier. It would also cause substantial signal loss and thereby drastically reduce the sensitivity of the device. Another inherent disadvantage of the Rossin device results from the fact that the two detectors share a common electrode which floats electrically. Since the common lead cannot be grounded, the device can be susceptible to static charge build-up and electrical pick-up which would become increasingly troublesome as the number of detectors in series is increased.

Another passive infrared intruder detection system is disclosed in U.S. Pat. No. 3,958,118 issued to F. Schwarz. Such a system includes a plurality (e.g. four) heat-sensitive capacitors which are electrically connected in parallel. While such a parallel arrangement of detectors is not subject to the aforementioned problems associated with the series-opposition connection of the detectors in the Rossin system, it is subject to false alarming as a result of sudden changes in pressure or temperature which affect two or more of the detectors simultaneously. For instance, a door slamming closed in the protected area will cause all of the detectors to generate a voltage simultaneously; this voltage results from the piezoelectric properties of the detectors. Likewise a thermal gradient will produce an output from all detectors simultaneously. Such events will produce false alarming of the system unless compensated for by relatively complex signal processing circuitry which can differentiate such events from the event of interest (i.e. intrusion).

SUMMARY OF THE INVENTION

An object of the present invention is to provide an improved infrared-sensitive detection system.

Another object of the invention is to provide an infrared-sensitive system in which the field of view is variable from wide angle to narrow beam.

Another object of the invention is to provide an infrared-sensitive detection system which is less sensitive to static electricity and electrical pick-up than are conventional systems.

Another object of the invention is to provide a unique pyroelectric detector.

Another object of the invention is to provide an infrared-sensitive system which is insensitive to events which would produce alarm-activating signals simultaneously from several or all of the detector elements of a multielement detector array.

Still another object of the invention is to provide a new method for making an array of pyroelectric detectors.

These and other objects of the invention are accomplished by the provision of an infrared intrusion detection system comprising a unique array of pyroelectric detectors, preferably disposed at the focus of a spherical mirror. According to a preferred embodiment, the array of detectors is formed from a uniformly polarized pyroelectric plastic film, such as polyvinylidene fluoride, the opposing surfaces of which support electrodes which, together with the interposed film, define a plurality of broad spectrum infrared radiation-sensitive capacitors. Preferably, selected capacitors are connected together to form two sets of heat-sensitive elements, the capacitors of each set being connected in parallel, and all of the capacitors having a common electrode which is electrically grounded. The two sets of non-grounded electrodes are operatively coupled to a differential amplifier, the output of which is used to trigger an alarm relay after suitable threshold detection.

According to another embodiment, the heat-sensitive plastic film forming a part of a selected set of capacitors is poled to a polarity opposite that of the other capacitors in the array, and all of the capacitors are connected in parallel. By this arrangement, a differential amplifier is unnecessary inasmuch as spurious signals which equally affect all of the capacitors are cancelled internally.

In still another preferred embodiment, the unique array of pyroelectric detectors cooperates with switching circuitry to provide a heat-sensitive detection system having a field of view that is readily alterable from narrow to wide field of view and vice versa.

Other objects of the invention and its various advantages will become more apparent to those skilled in the art from the ensuing detailed description of preferred embodiments, reference being made to the accompanying drawings.

BRIEF DESCRIPTION OF THE DRAWINGS

FIG. 5 is a block diagram of a circuit for processing electric signals generated by the detector array of FIG. 2;

FIG. 6 is a series of waveforms illustrating the voltages at various points in the circuit shown in FIG. 5;

DETAILED DESCRIPTION OF PREFERRED EMBODIMENTS

Figure 1:
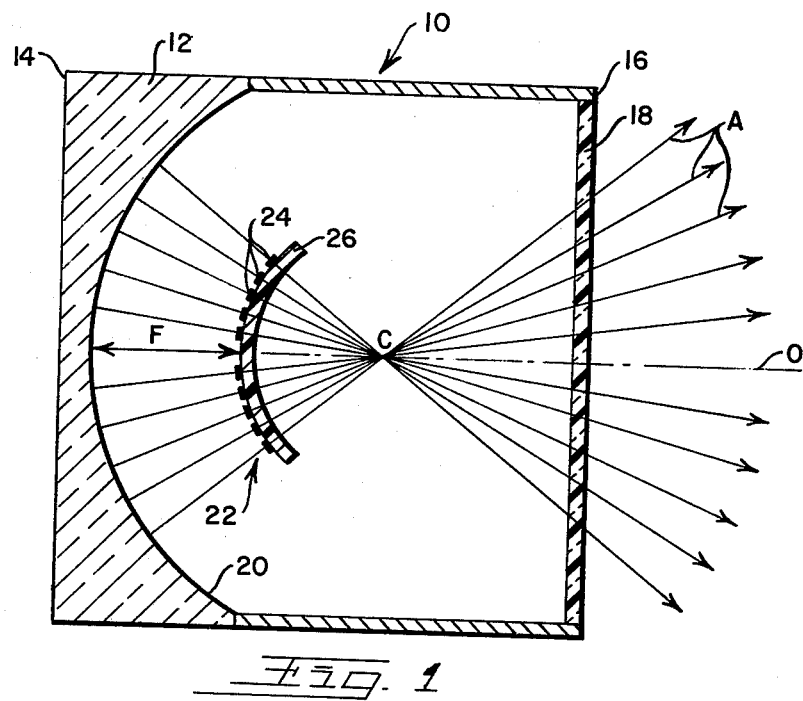
FIG. 1 is a top cross-sectional view of a preferred optical system for the passive infrared intruder detection system of the invention.

Referring now to the drawings, a passive-infrared intruder detection system according to a preferred embodiment of the invention is shown to comprise a generally cylindrical housing 10 (a top view being shown in cross-section in FIG. 1) within which a spherical mirror 12 having a center of curvature C and a focal length F is positioned at one end 14. The opposite end 16 of housing 10 is sealed by an infrared radiation-transmitting window 18, preferably fabricated from a thin sheet of polyethylene. This material is relatively transparent to infrared radiation at the wavelengths of interest (i.e. between 6 and 15 microns) and acts to eliminate air currents and dust which could adversely affect the system performance. Preferably, the concave reflecting surface 20 of mirror 12 is coated with a material which scatters or absorbs visible and near-infrared radiation and is relatively transparent to wavelengths longer than approximately 4 microns. Such a material, as is known in the art, is magnesium oxide powder which scatters radiation up to 4 microns and becomes transparent at longer wavelengths, thereby permitting the underlying mirror to focus target-generated infrared images.

At the focus of mirror 12 is positioned an array 22 of pyroelectric detectors 24. As is well known, a spherical mirror acts to focus incoming parallel rays at a point which is spaced from the mirror surface a distance F equal to one-half the center of curvature. Thus, to position all of the heat-sensitive detectors 24 of the array at the mirror focal points, an arcuate support 26 is provided, such support being a sector of a cylinder having a radius equal to the mirror focal length. The support is positioned such that the center of curvature thereof substantially coincides with that of the mirror. Preferably, support 26 comprises an electrically insulative material, having a low coefficient of thermal conductivity, such as any one of several closed cell foam plastics. Such a material acts to keep each of the heat-sensitive detectors electrically and thermally isolated and maximizes temperature changes in the detector for a given change in heat energy. Owing to the focal length of the mirror and the size of each detector 24, each detector has its own angular field of view preferably between 1.5 and 2 degrees. The optical axis of the spherical mirrors is generally designated as O, and the center of the various fields of view of the detectors are indicated by the arrows A.

Figure 2:
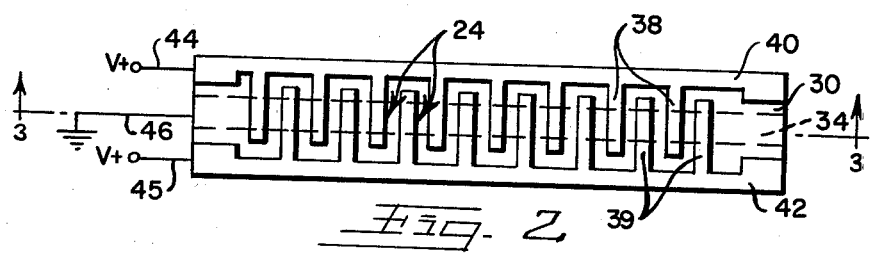
FIG. 2 is a side elevation of a detector array according to a preferred embodiment of the invention.
Figure 3:
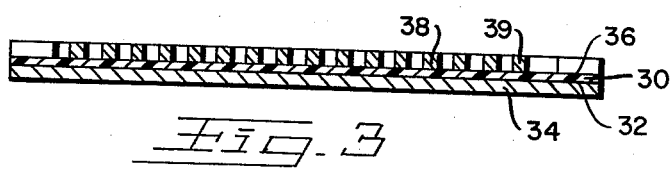
FIG. 3 is a cross-sectional view of the detector array of FIG. 2a taken along the section line 3—3.

Referring now to FIGS. 2 and 3, infrared radiation-sensitive detector array 22 is shown to comprise a film 30, e.g. 6–12 microns thick, of a pyroelectric material, preferably polyvinylidene fluoride (PVF$_2$) which has been appropriately poled. Pyroelectric PVF$_2$ film is commercially available from Kreha Chemical Company, New York, N.Y. Other suitable pyroelectric materials include lead zirconate titanate, lithium tantanate and triglycine sulfate. On one surface 32 of film 30 a single elongated electrode 34 is formed, such as by a conventional silk screen or evaporative metalization process. Electrode 34 extends over the entire length of surface 32 in the central region thereof.

On the opposite surface 36 of film 30 is a plurality of interdigitated electrodes 38 and 39 each having a portion which is directly opposite electrode 34. Like electrode 34, electrodes 38 and 39 may be formed by a silk screen or evaporative metalization process. Each electrode 38, 39 extends in a direction transverse to electrode 34, preferably perpendicular thereto. Electrodes 38 extend from and are electrically connected with an electrode 40 which extends along one lateral edge of surface 36. Similarly, electrodes 39 extend from and are electrically connected with an electrode 42 which extends along the opposite lateral edge of surface 36. Leads 44 and 45 extend from the array and are electrically connected with electrodes 40 and 42, respectively. Lead 46 extending from the array is electrically connected to the longitudinally extending electrode 34.

From the foregoing description, it may be appreciated that electrodes 38 and 39, together with opposing electrode 34 and that portion of film 30 positioned between opposing electrodes 38 and 34, and 39 and 34, form a linear array of heat-sensitive capacitors. Note, those capacitors of which electrodes 38 form a part are connected in parallel; similarly, those capacitors of which electrodes 39 form a part are also connected in parallel. As shown in the drawings, these two sets of parallel-connected capacitors are arranged in an interdigitated fashion; however, depending on the ultimate use of the detector array, it may be desirable to connect the capacitors in such a manner that alternate capacitors are not connected in parallel. Assuming the plastic film is uniformly poled, as discussed below, the detector array depicted in FIG. 2 has the equivalent electrical circuit depicted in FIG. 4.

In order to be pyroelectric, it is necessary that plastic film 30 be "poled;" i.e. be treated so that its molecules become aligned so as to produce a permanent electric field within the film. To pole polyvinylidene fluoride film, it is necessary to subject this film to an electric field of approximately 1000 volts per mil of thickness at a temperature of approximately 100° C. for thirty minutes. The film is then cooled slowly while the field is applied. This process is described in an article entitled "Polymeric Pyroelectric Sensors for Fire Protection," by Julius Cohen et al, in a National Bureau of Standards Report No. AFAPL-TR-74-16, published in July 1975. Uniformly poled polyvinylidene fluoride film having a coating of aluminum deposited on each side is commercially available from Kreha Chemical Company. An electrode pattern of the type depicted in FIG. 2 can be readily produced on this film by a conventional silk screen and etching process.

FIG. 5 is an electrical schematic of a passive infrared detection system according to a preferred embodiment of the invention. An interdigitated array 22 of an even number of pyroelectric detectors divided into two parallel connected sets serves as the input to a pair of high input impedance amplifiers, A1, A2, such as field effect transistors. Note, the negative lead of each detector (or heat-sensitive capacitor) is connected to ground. Resistors R1 and R2 are load resistors whose value is typically $10^{10}$ ohms. The amplified output of the two parallel-connected sets of detectors serve as the two inputs of a conventional differential amplifier A3 which produces a signal A proportional to the absolute difference in the input signals. The purpose of dividing the detectors into two sets and subtracting their respective outputs is to produce cancellation of signals caused by disturbances which affect all or most of the detectors simultaneously (e.g. room lights and sudden air pressure changes as occasioned by slamming doors, etc.). The detection system may, of course, comprise more than one detection unit; if so, the outputs of the additional units are summed with output A and the output of the summer is rectified to produce output signal B. A comparator with a fixed input receives signal B and generates a signal C when signal B exceeds a certain threshold. The output of the comparator C is AC coupled via capacitor C4 to a conventional monostable multivibrator, or "one-shot," which is designed to generate a signal for a fixed period of time, such as five seconds, each time the input to the comparator goes negative through the threshold level. Output C, together with the output D of the one-shot, is fed to an AND gate which generates a signal E when two signals appear simultaneously at the input terminals thereof. The output E of the AND gate is fed to a relay driver which generates an alarm signal F. FIG. 6 illustrates the waveform of the various output signals mentioned above in response to a typical noise signal, a target signal, and amplifier drift. Note, only when a second signal C appears within five seconds after the end of the first signal will an alarm signal be generated. Such an arrangement has been found particularly effective in discriminating between target-produced signals and noise or drift-produced signals.

Figure 4:
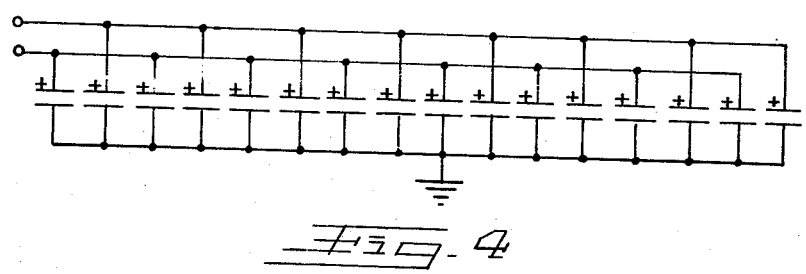
FIG. 4 schematically illustrates the equivalent circuit of the detector array depicted in FIGS. 2 and 3.
Figure 7:
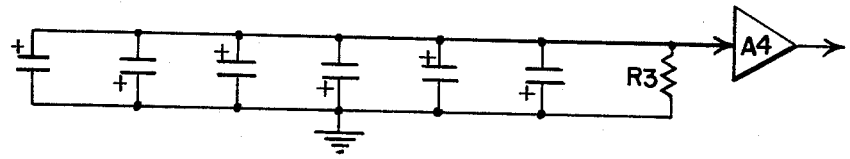
FIG. 7 schematically illustrates an equivalent circuit of another form of detector array.

As mentioned above, when film 30 is uniformly poled (i.e. all molecules in the film are polarized substantially in the same direction), then the detector array depicted in FIGS. 2 and 3 will have an equivalent circuit as shown in FIG. 4. If, on the other hand, the film positioned between each electrode pair is poled in the opposite sense or direction relative to the film positioned between adjacent electrode pairs, then the detector array of FIGS. 2 and 3, when leads 44 and 45 are connected so as to connect all capacitors in parallel, will have an equivalent circuit as shown in FIG. 7, excluding, of course, load resistor R3 and the high input impedance amplifier A4. Such a result can be achieved by poling the film after the electrodes 34, 38 and 39 have been formed. By merely connecting lead 44 to a positive poling voltage (e.g. +1000 volts per mil thickness of film) and connecting lead 45 to a negative poling voltage (e.g. −1000 volts per mil thickness of film) oppositely poled pairs of heat-sensitive capacitors can be produced in the same plastic film strip by the aforementioned process. Such a detector array has the advantage of not requiring the differential amplifier of the FIG. 5 circuit because the subtraction performed by such amplifier occurs internally within the array.

Figure 8:
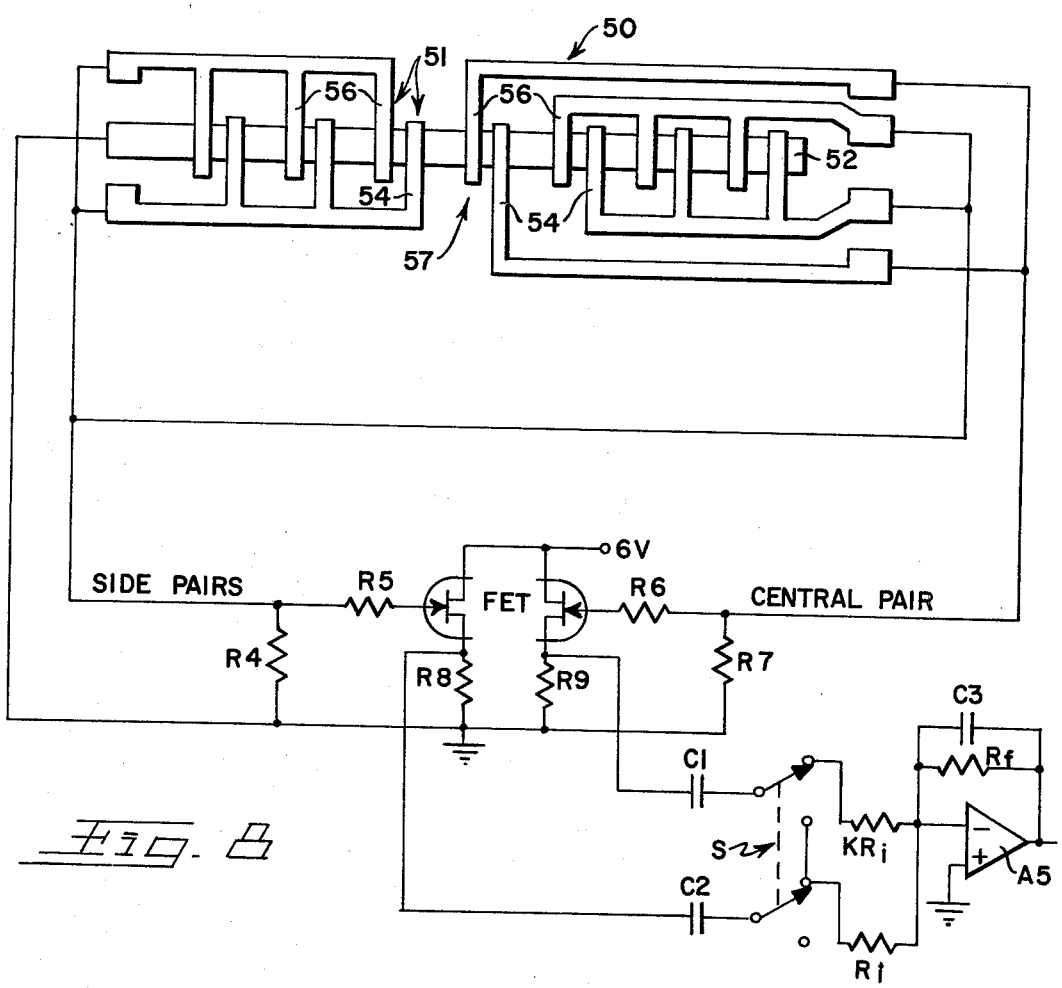
FIG. 8 is an electrical schematic of a circuit for amplifying the output of the detector array schematically illustrated in FIG. 7.

A detector array 50 comprising oppositely poled pairs of heat-sensitive capacitors 51 is shown in FIG. 8. As in the array depicted in FIG. 2, array 50 comprises a single electrode 52 which extends along the length of one surface of a heat-sensitive plastic film (not shown). On the opposite surface, interdigitated electrodes 54 and 56 are formed. Note, one pair 57 of electrodes at the center of the array are electrically isolated from the other electrodes. By means of switch S, shown in the electric schematic of FIG. 8, the detector array can be converted from a multizone or multi-field-of-view array, in which all of the heat-sensitive capacitors are functional, to a narrow field-of-view array, in which only heat-sensitive capacitors 57 are functional.

When switch S is in the position shown in FIG. 8, all of the heat-sensitive capacitors are functional, and the detector array will have, for instance, fourteen different fields of view. The oppositely poled pairs of heat-sensitive capacitors on each side of the central pair are connected in parallel with electrodes 54 and 56 connected to one of the gate leads of a dual field effect transistor (FET) through gate-protection resistor R5. The oppositely poled center pair 57 of heat-sensitive capacitors is connected in parallel and, through gate-protection resistor R6, is connected to the other gate lead of the FET. Resistors R4 and R7 are load resistors. The amplified outputs of the FET are AC coupled, via capacitors C1 and C2, to operational amplifier A5 through input resistors $KR_i$ and $R_i$. Resistors R8 and R9 serve as the source load resistors for the FET. Since the side pairs of heat-sensitive capacitors will load each other such that the output will be reduced by a factor of K relative to the isolated central pair, the amplified output of the central pair should be reduced by a factor of K before being summed with the amplified output of the side pairs; hence, the input resistor to which the amplified output of the central pair is connected should be K times the resistance of input resistance $R_i$ to which the side pairs are connected. By merely moving switch S to the other position, the amplified output of the central pair is connected to amplifier A5 through input resistance $R_i$ and the side pairs are disabled. Thus, the central pair will have full gain, thereby extending the range thereof relative to the other pairs. Feedback capacitor C3 determines the upper half-power frequency of amplifier A5, which is chosen to be approximately three hertz. Feedback resistor $R_f$, together with the input resistors established the midband gain of the amplifier.

In the FIG. 8 embodiment, it will be noted that all of the heat-sensitive capacitors 51 are connected in parallel; such an electrical connection is preferred for the reasons set forth above. However, it should be understood that the system would still be functional were electrode 52 to be segmented and electrodes 54 and 56 connected in such a manner as to connect capacitors 51 in series.

While the invention has been described with particular reference to preferred embodiments, various modifications and variations will become apparent to those skilled in the art without departing from the spirit and scope of the invention, as defined by the appended claims.

I claim:
1. In an infrared radiation-sensitive detector comprising:
(a) a plurality of infrared radiation-sensitive elements arranged to form an elongated array, each of said elements comprising first and second spaced electrodes between which a pyroelectric material is positioned, said elements being operative to pro- duce a voltage proportional to the rate of change of infrared radiation incident thereon; and (b) means connecting said elements electrically in parallel; the improvement wherein said pyroelectric material of each element is polarized to a polarity opposite that to which the pyroelectric material of adjacent elements in said array is polarized, whereby the voltages produced by adjacent elements which are subjected to the same change in incident radiation are substantially equal in amplitude and opposite in polarity.

2. The apparatus defined by claim 1 wherein said pyroelectric material comprises polyvinylidene fluoride.

3. An infrared radiation detection system comprising:
(a) at least four pyroelectric detectors, each of said detectors having a distinct field of view in a region under surveillance;
(b) first circuit means operatively connecting two of said detectors;
(c) second circuit means operatively connecting the other of said detectors;
(d) an amplifier circuit;
(e) switch means operatively coupled to said first and second circuit means and operable in a first state to connect the output of all of said detectors with said amplifier, and operable in a second state to connect less than all said detectors with said amplifier, whereby the fields of view of said system can be selectively altered.

4. The infrared radiation detection system as defined in claim 3 wherein said first circuit means comprises means for electrically connecting said two detectors in parallel, and said second circuit means comprises means for electrically connecting said other detectors in parallel.

5. The infrared detection system of claim 3 further comprising summing means operatively coupled to the output of said switch means for summing the outputs of said detectors to provide a summed signal.

6. The infrared detection system of claim 3 further comprising impedance means for reducing the output of said two detectors when said switch means is in said first state, whereby the sensitivity of all of said detectors is substantially the same when said switch means is in said first state.

7. The infrared detection system of claim 3 wherein each of said detectors comprises first and second spaced electrodes between which a pyroelectric plastic material is positioned to define a pyroelectric capacitor, wherein the plastic material of each capacitor is polarized to a polarity opposite that of adjacent capacitors, and wherein said two capacitors are adjacent to each other.

8. The infrared detection system of claim 7 wherein said plastic material comprises polyvinylidene fluoride.

9. An infrared radiation-sensitive system comprising:
(a) a plurality of infrared radiation-sensitive detectors arranged in an elongated array, each of said detectors having a unique field of view in a space in which infrared radiation is to be detected, and each of said detectors comprising first and second spaced electrodes between which a pyroelectric material is disposed, said detectors being operative to produce a voltage proportional to the rate of change of infrared radiation incident thereon, said material of each detector being polarized to a polarity opposite that to which the material of adjacent detectors in said array is polarized, whereby the voltages produced by adjacent detectors which are subjected to the same change in incident radiation are substantially equal in amplitude and opposite in polarity;
(b) circuit means connecting said detectors electrically in parallel; and
(c) means operatively coupled to said detectors for activating an alarm in response to the voltage produced by any one of said detectors exceeding a predetermined threshold level.

10. The infrared radiation-sensitive system of claim 9 wherein said material is polyvinylidene fluoride.

11. A method of making an array of infrared radiation-sensitive detectors, said method comprising the steps of:
(a) forming an elongated first electrode on one surface of a material which, when appropriately polarized, exhibits pyroelectric properties;
(b) forming a plurality of spaced second electrodes on the opposite surface of such material, the second electrodes being arranged so that a portion of each is positioned directly opposite the first electrode, thereby defining an elongated array of capacitors;
(c) connecting together the second electrodes of alternate capacitors in the array;
(d) connecting together the second electrodes of the remaining capacitors in the array;
(e) producing an electric field between the first electrode and the second electrodes of said alternate capacitors for a time and at a temperature sufficient to permanently polarize the material between such electrodes to a first polarity;
(f) producing an electric field between said first electrode and the second electrodes of said remaining capacitors for a time and at a temperature sufficient to permanently polarize the material between such electrodes to a polarity opposite said first polarity, whereby the material of each capacitor is poled to a polarity opposite that of the material of adjacent capacitors.

12. The method defined by claim 11 wherein said material comprises polyvinylidene fluoride.

13. An infrared radiation detection system comprising:
(a) a plurality of infrared radiation-sensitive detectors, each of said detectors having a distinct field of view in a region under surveillance and being adapted to provide an electrical output representative of the infrared radiation incident thereon;
(b) a threshold sensing circuit for producing an alarm-actuating signal in response to receiving an input signal which exceeds a predetermined threshold level; and
(c) switching means selectively operable in a first state for connecting the outputs of all of said detectors to said threshold sensing circuit, and in a second state for connecting the outputs of less than all the detectors to said threshold sensing circuit, whereby the field of view of said system can be selectively altered.

14. The system as defined by claim 13 wherein said infrared radiation-sensitive detectors comprise pyroelectric detectors.

* * * * *